US010295309B2

(12) United States Patent
Loukus et al.

(10) Patent No.: US 10,295,309 B2
(45) Date of Patent: May 21, 2019

(54) CORE STRUCTURED COMPONENTS AND CONTAINERS

(71) Applicant: REL, Inc., Calumet, MI (US)

(72) Inventors: Adam R. Loukus, Calumet, MI (US); Josh E. Loukus, Calumet, MI (US)

(73) Assignee: LOUKUS TECHNOLOGIES, INC., Calumet, MI (US)

( * ) Notice: Subject to any disclaimer, the term of this patent is extended or adjusted under 35 U.S.C. 154(b) by 0 days.

(21) Appl. No.: 14/326,458

(22) Filed: Jul. 8, 2014

(65) Prior Publication Data

US 2015/0014323 A1    Jan. 15, 2015

Related U.S. Application Data

(60) Provisional application No. 61/843,630, filed on Jul. 8, 2013.

(51) Int. Cl.
*B32B 1/02* (2006.01)
*B32B 3/26* (2006.01)
(Continued)

(52) U.S. Cl.
CPC .............. *F41H 5/04* (2013.01); *B29C 39/025* (2013.01); *B32B 1/02* (2013.01); *B32B 3/266* (2013.01);
(Continued)

(58) Field of Classification Search
CPC ... F41H 5/04; F41H 7/044; B32B 1/02; B32B 3/22
See application file for complete search history.

(56) References Cited

U.S. PATENT DOCUMENTS 3,528,582 A    9/1970  Rigollot
3,979,005 A    9/1976  Robinson et al.
(Continued)

FOREIGN PATENT DOCUMENTS

DE    19524680    1/1997
DE    10343250    5/2004
(Continued)

OTHER PUBLICATIONS

Communication Pursuant to R 161(1) and 162 EPC for European Patent Application No. 14748017.2 dated Feb. 18, 2016 (2 pages).
(Continued)

*Primary Examiner* — Jeffrey R Allen
(74) *Attorney, Agent, or Firm* — Device Patent LLC

(57) ABSTRACT

A structural component with at least two side members has a support structure that includes a partition with multiple curved portions forming cells. The partition connects to the side members and extends between the side members at least partially along straight lines. The partition may extend along one or more straight lines from one side member to the other. One structural component is a container with a wall about the internal support structure. The container cells may be formed with a core structure. The core can include a permeable storage material and may be retained after formation, or may be removed. In some cases the container wall has generally planar surfaces, which may include surface undulations. Core structures are also provided for forming structural components. Formation can include casting a material about a core structure within a mold to form a partition extending between two or more sides.

21 Claims, 12 Drawing Sheets
(2 of 12 Drawing Sheet(s) Filed in Color)

(51) Int. Cl.
*F41H 5/04* (2006.01)
*B60P 3/22* (2006.01)
*B29C 39/02* (2006.01)
*F41H 7/04* (2006.01)
*F42D 5/045* (2006.01)
*F17C 1/00* (2006.01)
*B32B 15/04* (2006.01)
*B32B 27/06* (2006.01)

(52) U.S. Cl.
CPC .............. *B32B 15/04* (2013.01); *B32B 27/06* (2013.01); *B60P 3/22* (2013.01); *F17C 1/00* (2013.01); *F41H 7/044* (2013.01); *F42D 5/045* (2013.01); *B32B 2305/02* (2013.01); *B32B 2307/558* (2013.01); *B32B 2439/00* (2013.01); *B32B 2571/02* (2013.01); *F17C 2201/0157* (2013.01); *F17C 2201/0161* (2013.01); *F17C 2201/0166* (2013.01); *F17C 2201/0171* (2013.01); *F17C 2201/054* (2013.01); *F17C 2201/056* (2013.01); *F17C 2203/0617* (2013.01); *F17C 2203/0636* (2013.01); *F17C 2203/0663* (2013.01); *F17C 2209/21* (2013.01); *F17C 2209/2109* (2013.01); *F17C 2209/232* (2013.01); *F17C 2221/033* (2013.01); *F17C 2223/013* (2013.01); *F17C 2223/0123* (2013.01); *F17C 2223/035* (2013.01); *F17C 2223/036* (2013.01); *F17C 2260/01* (2013.01); *F17C 2260/011* (2013.01); *F17C 2260/012* (2013.01); *F17C 2260/017* (2013.01); *F17C 2260/018* (2013.01); *F17C 2270/0171* (2013.01); *Y10T 428/13* (2015.01); *Y10T 428/249953* (2015.04)

(56) References Cited

U.S. PATENT DOCUMENTS

| | | | |
|---|---|---|---|
| 4,840,282 | A | 6/1989 | Gerhard et al. |
| 4,946,056 | A | 8/1990 | Stannard et al. |
| 5,151,246 | A | 9/1992 | Baumeister et al. |
| 5,323,953 | A | 6/1994 | Adderley et al. |
| 5,462,193 | A | 10/1995 | Schoo et al. |
| 5,564,587 | A | 10/1996 | Falk et al. |
| 5,577,630 | A | 11/1996 | Blair et al. |
| 5,647,503 | A | 7/1997 | Steele et al. |
| 5,651,474 | A | 7/1997 | Callaghan et al. |
| 5,758,796 | A | 6/1998 | Nishimura et al. |
| 5,927,537 | A | 7/1999 | Falk et al. |
| 5,944,215 | A | 8/1999 | Orlowski |
| 6,536,425 | B1 | 3/2003 | Izuchukwu et al. |
| 6,668,561 | B1 | 12/2003 | Sheu et al. |
| 7,211,228 | B2 | 5/2007 | Suzuki et al. |
| 7,479,314 | B2 | 1/2009 | Endres et al. |
| 8,075,827 | B2 | 12/2011 | Loukus et al. |
| 9,234,626 | B2 | 1/2016 | Simmons et al. |
| 2005/0006394 | A1 | 1/2005 | Fujihara et al. |
| 2007/0000016 | A1* | 1/2007 | Handa .................... B60K 15/00 2/158 |
| 2007/0194051 | A1 | 8/2007 | Bakken et al. |
| 2008/0283419 | A1 | 11/2008 | Veksler et al. |
| 2009/0050635 | A1 | 2/2009 | Richards et al. |
| 2009/0321044 | A1 | 12/2009 | Hernon et al. |
| 2009/0321045 | A1 | 12/2009 | Hernon et al. |
| 2009/0321046 | A1 | 12/2009 | Hernon et al. |
| 2012/0279683 | A1 | 11/2012 | Arney et al. |
| 2013/0058042 | A1 | 3/2013 | Salamon et al. |
| 2013/0269901 | A1 | 10/2013 | Loukus et al. |
| 2013/0269902 | A1 | 10/2013 | Loukus et al. |
| 2013/0299148 | A1 | 11/2013 | Hernon et al. |
| 2014/0014493 | A1* | 1/2014 | Ryan ....................... B01D 3/008 203/89 |
| 2014/0061066 | A1 | 3/2014 | Chung et al. |
| 2014/0069972 | A1 | 3/2014 | Willemsen et al. |
| 2014/0224809 | A1 | 8/2014 | Loukus et al. |
| 2014/0262194 | A1 | 9/2014 | Hernon et al. |
| 2014/0290925 | A1 | 10/2014 | Hernon et al. |
| 2015/0075752 | A1 | 3/2015 | Taheny et al. |

FOREIGN PATENT DOCUMENTS

| | | |
|---|---|---|
| DE | 102010008263 | 8/2011 |
| EP | 2565977 | 3/2013 |
| EP | 2618645 | 7/2013 |
| EP | 2698609 | 2/2014 |
| EP | 2757594 | 7/2014 |
| FR | 1591601 | 5/1970 |
| GB | 1358073 | 6/1974 |
| WO | 2012148154 | 10/2012 |
| WO | 2014025840 | 2/2014 |
| WO | 2014124347 | 8/2014 |
| WO | 2014131460 | 9/2014 |
| WO | 2015006381 | 1/2015 |

OTHER PUBLICATIONS

Communication Pursuant to Rules 161 and 162 EPC for European Patent Application No. 14713948.9, dated Dec. 11, 2015 (2 pages).
Dunham, Douglas "Patterns on Triply Periodic Uniform Polyhedra," Proceedings of ISAMA 2012, Jun. 18-22, 2012, pp. 1, 23-28, retrieved from http://www.isama.org/hyperseeing/12/12b.pdf on Apr. 8, 2016.
Ferreira, J. C. et al., "A numerical and experimental study of fracture in RP stereolithography patterns and ceramic shells for investment casting," Journal of Materials Processing Technology, vol. 134, Issue 1—Abstract Mar. 1, 2003, 2 pages.
Hosni, Yasser A. et al., "Investment Casting Using Stereolithography: The Case of Complex Objects," Rapid Prototyping, vol. 5, No. 1, pp. 1-5; Rapid Prototyping Association of the SME, First Quarter 1999; retrieved from http://www.engineersedge.com/investment_casting_article.htm, on Feb. 18, 2016.
International Preliminary Report on Patentability for PCT Application No. PCT/US2014/045834 dated Jan. 21, 2016, (8 pages).
Office Action for Canadian Patent Application No. 2,919,385 dated Apr. 4, 2016 (4 pages).
Onuh, S. O. et al., "Rapid prototyping technology: applications and benefits for rapid product development," Journal of Intelligent Manufacturing, vol. 10 1999, 301-311.
"Overviews: Investment Casting," CustomPartNet, 2009, retrieved from http://www.custompartnet.com/wu/investment-casting on Feb. 18, 2016, pp. 1-3.
Pal, D. K. et al., "Computer-aided Reverse Engineering for Rapid Replacement of Parts," Defence Science Journal, vol. 56, No. 2, Apr. 2006, 225-238.
"Precoated sand / resin coated sand made in China for casting," Fulian Molding Materials Industry Co., Ltd., pp. 1-5, retrieved from http://gdfulian.gmc.globalmarket.com/products/details/precoated-sand-resin-sand-made-in-china-for-casting-9488541.html, accessed Feb. 3, 2016.
"Rapid Tooling in Metal Casting," Sand Casting, Investment Casting, Permanent Mold Casting, Pressure Die Casting Retrieved from http://www.uni.edu/~rao/rt/casting.htm on Feb. 18, 2016, pp. 1-9.
"Schwarz minimal surface," From Wikipedia, the free encyclopedia Retrieved from: https://en.wikipedia.org/wiki/Schwarz_minimal_surface on Feb. 18, 2016, pp. 1-4.
"Superior Die Casting & Tooling," Premier Die Casting Company Die Casting Company / Die Casting Services, pp. 1-9, retrieved from http://diecasting.com/ on Feb. 18, 2016.
"The Schwarz P Surface," Mathematical Sciences Research Institute: The Scientific Graphics Project. Retrieved from http://www.msri.org/publications/sgp/jim/geom/minimal/library/P/mainc.html on Feb. 18, 2016, pp. 1-2.
Weidemann, B. et al., "Strategies and applications for rapid product and process development in Daimler-Benz AG," Computers in Industry, vol. 39, Issue 1, Jun. 1, 1999, Abstract, pp. 1-3 Down-

(56) References Cited

OTHER PUBLICATIONS loaded from http://www.sciencedirect.com/science/article/pii/S0166361598001262 on Feb. 18, 2016.
"International Preliminary Report on Patentability," for PCT/US2013/053877 dated Sep. 3, 2015 (7 pages).
"International Preliminary Report on Patentability," for PCT/US2014/015454 dated Oct. 29, 2015 (7 pages).
"International Search Report & Written Opinion," for PCT/US2014/015454 dated Aug. 31, 2015 (9 pages).
"International Search Report & Written Opinion," for PCT/US2014/045834 dated Apr. 9, 2015 (11 pages).
"International Search Report & Written Opinion," for PCT/US2013/053877 dated Aug. 19, 2015 (9 pages).
Schoen, Alan H. "Triply—periodic Minimal Surfaces," Alan Schoen Geometry (http://schoengeometry.com/e-tpms.html) accessed Jul. 14, 2015 (292 pages).
Setlock, Robert J. "Hydrostatic Pressure Retainment," Thesis, College of Engineering and Technology of Ohio University, 2004 (107 pages).
Non-Final Office Action for U.S. Appl. No. 14/176,093, dated Apr. 22, 2016 (20 pages).
Response to Communication Pursuant to Rules 161 and 162 EPC for European Patent Application No. 14713948.9, filed with the EPO Jun. 10, 2016 (24 pages).
Response to Communication Pursuant to Rules 161 and 162 EPC for European Patent Application No. 14748017.2, filed with the EPO Aug. 18, 2016 (21 pages).
Response to Office Action for Canadian Patent Application No. 2919385, filed with Canadian Patent Office Jul. 4, 2016 (24 pages).
Final Office Action for U.S. Appl. No. 14/176,093 dated Jan. 26, 2017 (8 pages).
Non-Final Office Action for U.S. Appl. No. 14/616,646, dated Dec. 16, 2016 (15 pages).
Communication Pursuant to Article 94(3) EPC for European Patent Application No. 14713948.9, dated Mar. 21, 2017 (5 pages).
Final Office Action for U.S. Appl. No. 14/176,093 dated Sep. 7, 2017 (10 pages).
Response to Final Office Action dated Jan. 26, 2017, for U.S. Appl. No. 14/176,093, submitted via EFS-Web on Jul. 26, 2017, 10 pages.

\* cited by examiner

CORE STRUCTURED COMPONENTS AND CONTAINERS

CROSS-REFERENCES

This application claims the benefit of U.S. Provisional Application No. 61/843,630, filed Jul. 8, 2013, the content of which is hereby incorporated by reference in its entirety.

STATEMENT REGARDING FEDERALLY SPONSORED RESEARCH OR DEVELOPMENT

This invention was made with government support under contract DE-AR0000253 awarded by the U.S. Department of Energy. The government has certain rights in the invention.

FIELD

This disclosure generally relates to structural components, including containers, and more particularly relates to support structures for structural components, as well as core structures and methods for forming structural components with core structures.

BACKGROUND

In a general sense, a structural component can be any part that is designed to carry or bear some amount of load or force. Load-bearing construction materials, reinforcement materials, impact-resistant materials such as armor, and structural members of automobiles are just a few examples of the many types of products that include structural components. One type of a structural component is a containment vessel, also referred to herein more generically as a container or a tank. Containment vessels are used for storing many things, including fluids such as liquids and gases. In many cases the contents of a tank will be pressurized to store a larger volume. As a well-known example, consumer-grade propane tanks are commonly sold storing a volume of propane gas under pressure that can be released by hand valve. Larger tanks for storing the fertilizer anhydrous ammonia are also well known. Anhydrous ammonia must be stored at high pressure and low temperature to maintain a liquid phase. Thus, large commercial-grade tanks must be designed to withstand the pressure exerted on the tank walls by the compressed ammonia. Another example includes containment vessels designed for storing compressed natural gas under high pressure, which can be useful for transporting a large volume of gas in a smaller, portable vessel, as in the case of vehicles that use compressed natural gas as a fuel. Of course many other examples of containers and, more generally, structural components exist.

For a containment vessel, it can be useful to design the container to withstand greater pressures so that the container can store larger volumes of gas under higher pressures without failing. More generally, it is often desirable to simply increase the load bearing capacity of any type of structural component. One common method of increasing load bearing capacity is to simply reinforce existing support structures. For example, cylindrical tanks with thicker walls can provide higher tensile and rupture strengths than a tank with thinner walls. Another well-known method of increasing the load bearing capacity of a structural component is to incorporate geometric curves or arcs into the design of the component. Typical foam materials having a cell structure incorporating spherically-shaped voids provide one example of a technique for increasing load bearing capacity. Cylindrical gas tanks provide another example of a component incorporating a curved design. The cylindrical geometry of the tank wall more evenly distributes the load exerted by the pressurized gas inside the tank.

Structural components, including containers, can be made from a wide variety of materials using many different methods. Casting is one well-known process that has been used to manufacture a variety of structural components.

SUMMARY

Some of the embodiments described herein include structural components having a support structure that includes a partition extending between at least two side members of the structural component. The partition includes multiple curved portions. Embodiments also provide core structures that are useful for making structural components. The core structures have a configuration that shapes and contours the support structure of a structural component, such as a partition, during the making of the structural component. In addition, some embodiments are directed to methods for making structural components, while additional embodiments are useful for making core structures. A container is one example of a structural component provided by some of the embodiments described herein.

In one embodiment, a structural component includes a first side member, a second side member, and a support structure. The support structure includes a partition that extends between the first side member and the second side member. The partition connects to the first side member and the second side member and extends between the side members at least partially along a plurality of straight lines. The partition also has a thickness and includes multiple curved portions. The curved portions form a number of cells within the support structure of the structural component.

Another embodiment of the invention provides a structural component in the form of a container. The container includes an internal support structure that defines multiple cells. The container also includes a wall that substantially encloses the internal support structure and the cells. The wall includes at least two portions, which can be described as a first wall portion and a second wall portion. The internal support structure provides a partition that is connected to the first wall portion and the second wall portion. The partition extends between the first wall portion and the second wall portion at least partially along a number of straight lines. The partition also exhibits a thickness. Multiple curved portions of the partition form the plurality of cells defined by the internal support structure.

Some embodiments provide a method for forming a structural component. In some cases the structural component is a container. Such a method can include providing a mold and positioning a core structure in a cavity of the mold, which is defined by multiple mold walls. Positioning the core structure in the cavity defines at least two paths for material to flow within the mold. In one case, positioning the core structure creates a first material flow path between the core structure exterior and two or more walls of the mold. The core structure has a first portion and a second portion that interlock to define and form a second material flow path between the interlocking first and second portions. In this embodiment the method also includes forming an external container wall by introducing a material into the first material flow path, and forming a partition and multiple cells by introducing the material into the second material flow path. In some cases the partition is approximately shaped as a periodic minimal surface that provides a lattice arrangement for the cells. The material is then solidified as part of forming the container or other structural component.

According to some embodiments of the invention, the partition of a support structure, such as a container or other structure, extends at least partially along two or more straight lines between first and second side members of the support structure. In some cases, the partition also extends along one or more of the straight lines from the first side member to the second side member. The partition may also extend from the first side member to the second side member along two, three, or more of the straight lines for some configurations.

In embodiments in which the partition includes multiple curved portions, at least one of the curved portions can be described as including a support point. In some cases the multiple curved portions define multiple support points. At least two of the straight lines intersect at each of the support points. Some of these embodiments can optionally include a partition that is approximately shaped as a periodic minimal surface. The partition can thus define a lattice arrangement for the plurality of cells that approximately corresponds to the periodic minimal surface. In further embodiments, the partition of a support structure is further, and approximately, shaped as a Schwarz P surface.

As mentioned above, in some cases a structural component is configured as a container that includes an external wall. The first side member and the second side member are part of the external wall and the support structure includes a partition. The partition has a first surface and a second surface with its thickness extending between the first and the second surfaces. In some cases the first surface at least partially defines a first contiguous cavity, while the second surface at least partially defines a second contiguous cavity. According to some configurations, the partition separates the first contiguous cavity from the second contiguous cavity.

In these embodiments and others, the partition of a structural component can in some cases be formed from a solidified material that has a shape corresponding to a material flow path within a core structure that was used to form the structural component. Further, in some cases the side members of a structural component may be formed from the same solidified material as the structural component's support structure, which may be integrally formed with the side members. For example, in some cases a container's external wall and support structure partition are integrally formed and comprise a solidified material. Possible examples of solidified materials include, but are not limited to, one or more of a metal, a metal matrix composite, a glass, an elastomer, a confection, a thermoplastic polymer, and a thermosetting polymer. Further, in some cases, one or more cells of a container may include a permeable storage material configured to store a fluid.

In some embodiments, the invention provides a container wall that includes multiple generally planar surfaces. For example, the generally planar surfaces may be joined together along generally straight edges to form a three-dimensional shape such as a rectangular solid, a cube, and other shape configurations that include two or more generally planar surfaces, including symmetrical and asymmetrical configurations. In such embodiments, one or more of the generally planar surfaces may in some cases include an undulation or other surface contour.

According to some embodiments, a container-type structural component includes a support structure with multiple cells of a certain size. For example, in some cases each cell has a size that is related to the thickness of the support structure's partition, as well as to the burst pressure of the container and the yield strength the container's material. In some cases the cell size is approximately proportional to the thickness of the container's partition and the container's burst pressure, and approximately inversely proportional to the yield strength of the container material.

According to some embodiments of the invention, a structural component can have one of a wide variety of forms. One example includes a structural component configured as a container. In some cases the invention may provide a container configured to store fluids, such as liquids and gases. Containers in accordance with the invention may in some cases be configured to store one or more fluids at above-atmospheric pressures. One example of a fluid that may be stored in a container is compressed natural gas. In some cases an embodiment of the invention provides a vehicular assembly that includes a vehicle with a fuel system that includes such a container. Some embodiments of the invention also provide methods for storing one or more fluids under pressure. For example, a method can include introducing the fluid into a container through an inlet and then closing the inlet.

In further embodiments, a single container can be configured to separately store at least two fluids, for example, in separate cavities of the container. In some cases, at least two cavities are configured to store fluids at different pressures. In another example, two cavities can be configured to allow energy exchange between fluids passing through the cavities, such as in the case of a heat exchanger.

Embodiments of the invention provide other forms of structural components as well. Additional examples of types of structural components include armor systems, such as armored plates and blast panels for armored vehicles, including V-hull personnel carriers and fighting vehicles. In another embodiment, structural components in accordance with the invention can be incorporated into stiffening plates that provide enhanced structural integrity for different applications. One possible example includes reinforcement plates for aircraft carriers. In some embodiments structural components according to the invention can be incorporated into parts of a vehicle, such as bumpers and crumple zones, that are configured to absorb energy in the event of a crash.

These and various other features and advantages will be apparent from a reading of the following detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following drawings illustrate some particular embodiments of the present invention and therefore do not limit the scope of the invention. The drawings are not to scale (unless so stated) and are intended for use in conjunction with the explanations in the following detailed description. Some embodiments will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides some practical illustrations for implementing some embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Various new embodiments of cast preforms, cast core structures, cast structural components (e.g., containers), methods for casting structural components, methods for casting preforms and core structures, and related features, techniques, and details are described below. As used herein, the term "structural component" refers broadly to a part or component that can bear a load. Accordingly, a structural component can generally be considered to have an interface that receives the load and some type of support structure that supports the interface while it receives the load. Examples of structural components are numerous and evident in virtually every aspect of man-made structures. As just a few examples, foam materials used for padding or shock absorption, crash pads installed on a median that absorb the impact of a wayward vehicle on a freeway, parts of such a vehicle designed to withstand impacts, armor plating, and ballistic armor are all considered examples of structural components for purposes of this disclosure. In addition, various types of containers, including but not limited to containment and storage vessels, pressurized and non-pressurized tanks, and dry storage units are all examples of structural components. Of course a wide variety of other structural components are also contemplated although not mentioned herein.

As will be appreciated, some embodiments described herein are directed to structural components that are at least in part cast by introducing a molten material into a mold and then letting the material solidify to form the desired component.

Figure 1A:
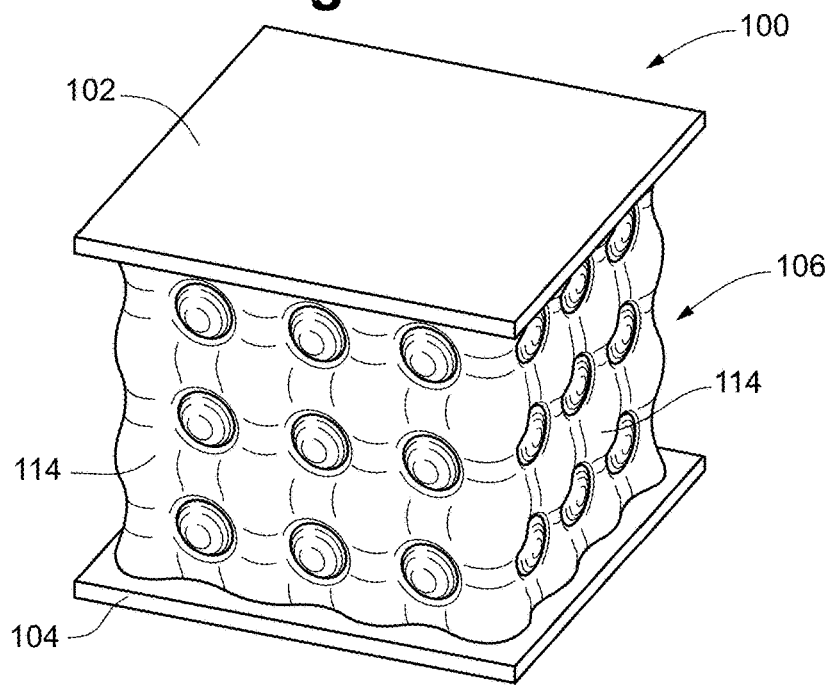
FIGS. 1A and 1B are perspective and cross-sectional views, respectively, of a structural component according to one embodiment.

Turning to the drawings, FIG. 1A is a perspective view of a structural component 100 according to one embodiment of the invention. The structural component 100 includes a first side member 102 and a second side member 104. A support structure 106 extends between the side members and thus provides the structural component 100 with some capacity to counteract forces that act on one or more of the first side member 102 and the second side member 104.

Figure 1B:
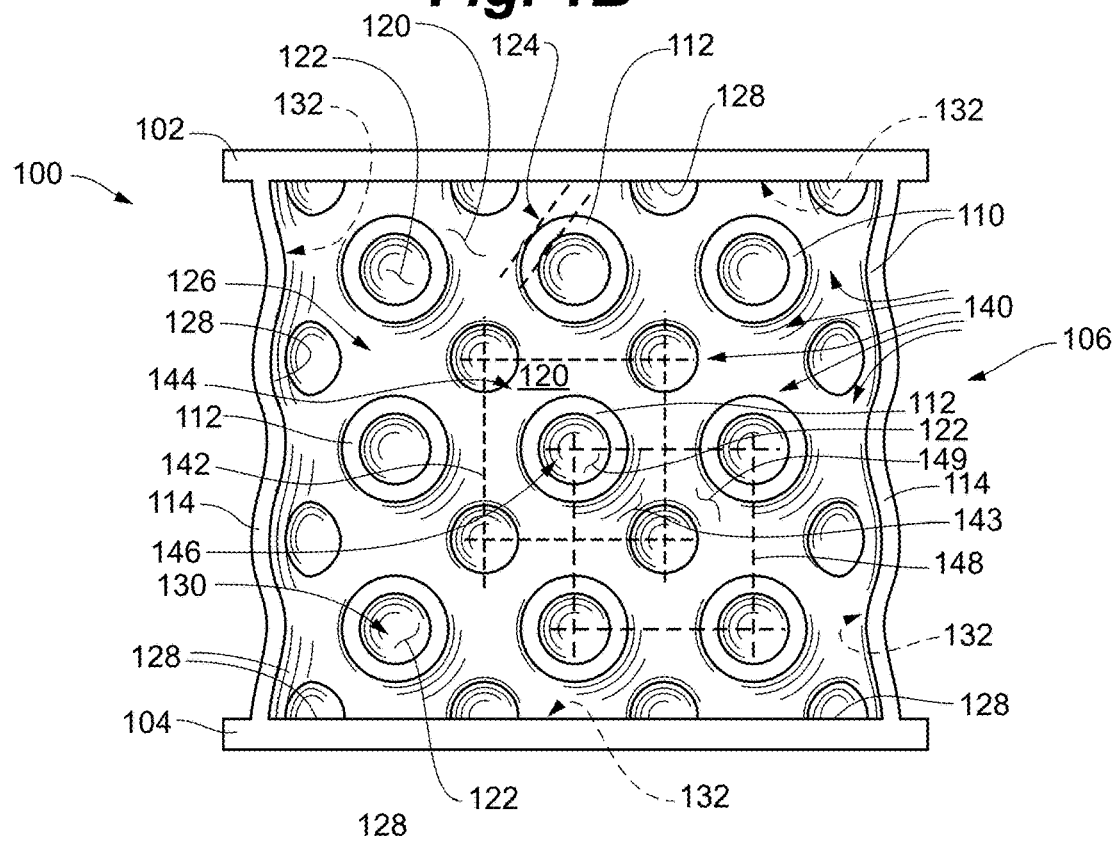

FIG. 1B is a cross-sectional view of the structural component 100, providing a view of the internal portion of the support structure 106. In this embodiment the support structure 106 is formed from a single, continuous, wall or partition 110 that extends between and connects to the first and second side members 102, 104. The partition 110 in this example can generally be described as including an inner partition 112 and multiple outer wall partitions 114. The inner partition 112 includes a first surface 120 and a second surface 122, which are separated by and opposite from each other across the thickness 124 of the inner partition 112.

In this example, the first surface 120 is a substantially continuous surface that defines a first space or cavity 126 within the structural component 100. The first cavity 126 is bounded by the first surface 120 and some inner surfaces 128 of the outer wall partitions 114 and the first and second side members 102, 104. In a likewise manner, the second surface 122 defines a second space or cavity 130. The second cavity 130 is bounded, in this instance, by the second surface 122 and other inner surfaces 132 (referenced with dashed arrows) of the outer wall partitions 114 and the first and second side members 102, 104.

The inner portion 112 includes multiple curved portions 140 that form a number of cells within the support structure 106. (In this example the outer wall partitions 114 also include multiple curved portions.) In this example, the curved portions 140 position the cells into two sets of cells with an interlocking lattice arrangement. A unit cell in this embodiment has a cubic shape and encompasses a portion of the inner partition 112. As shown in FIG. 1B, a first cell 142 (shown from a side view) intersects the inner partition 112 at symmetrical locations to demarcate a multi-curved portion 143 of the inner partition 112. The multi-curved portion 143 in this embodiment fits within the cubic boundary of the first cell 142 and includes a larger central volume that narrows to six cylindrically-shaped openings, one opening associated with each of the faces of the cubic cell.

The multi-curved portion 143 generally divides the unit cell 142 into two volumes. The view of FIG. 1B illustrates one of the volumes 144 as being outside the inner partition 112 and adjacent the first surface 120. This first volume of the cell 142 is thus part of the first cavity 126 bounded in part by the first surface 120. The second volume 146 is depicted as being inside the inner portion 112, and is thus adjacent the second surface 122 and part of the second cavity 130. For some purposes, the multi-curved portion 143 and the second volume 146 for each unit cell 142 can be thought of or described as a unit compartment or a unit cavity because the second volume 146 represents one portion or unit of the second cavity 130.

A second unit cell 148 is also illustrated in FIG. 1B. This unit cell 148 generally has the same characteristics as the first unit cell 142, with one exception being that the position of the second unit cell 148 is diagonally offset from the position of the first cell 142. Accordingly, cell 148 and other cells like it intersect and encompass parts of the inner partition 112 to define multi-curved portions 149 in much the same way that cell 142 intersects and encompasses a portion of the inner partition 112. One difference between the cells 142, 148, though, is that the second cell 148 intersects, encompasses, and defines the multi-curved portion 149 in an opposite manner from the first cell 142.

Figure 1C:
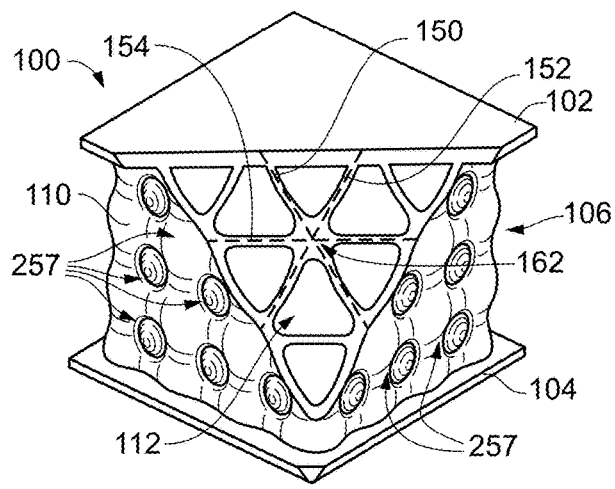
FIGS. 1C-1E are cross-sectional views of the structural component of FIGS. 1A and 1B that illustrate a partition extending at least partially along multiple straight lines according to one embodiment.
Figure 1D:
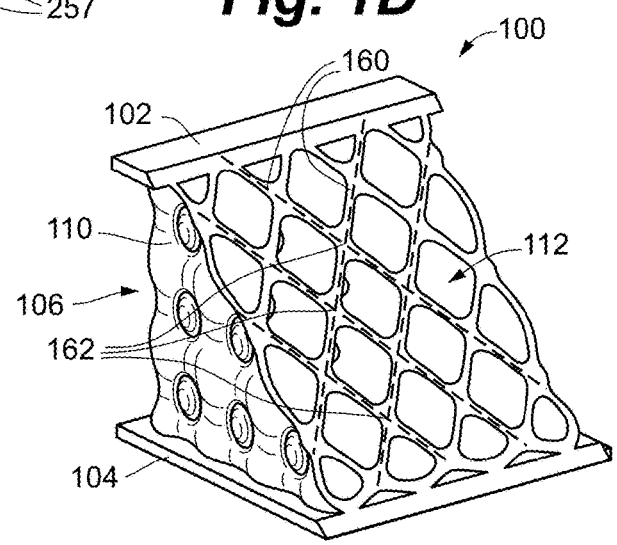
Figure 1E:
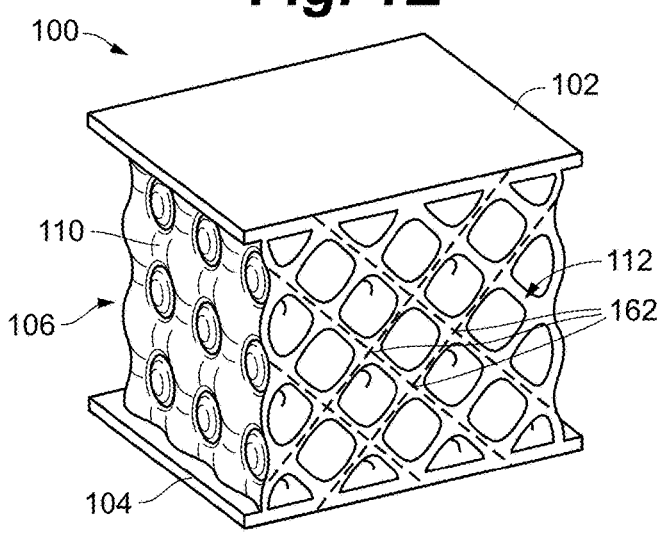

FIGS. 1C-1E are different cross-sectional views of the structural component 100 of the illustrated embodiment. The cross-sections show how the partition 110 and, in particular the inner partition 112, extends between the first and second side members 102, 104 of the structural component 100. As each of the views show, the partition 112 is connected to both of the side members 102, 104, and winds along a vast multitude of lines and curves, about and around multiple cells and volumes, as it extends between the first and the second side members 102, 104.

At least part of the inner partition 112 (in this embodiment, at least the parts visible in FIGS. 1C-1E), however, extends along multiple straight lines between the first and the second side members 102, 104. With reference to FIG. 1C, for example, the portion of the inner partition 112 shown in the cross-section extends along a first straight line 150, a second straight line 152, and a third straight line 154, while also extending at least part of the way between the first and the second side members 102, 104. Although not shown in these examples, in some cases the partition of a structural component may fully extend between side members while also extending along one or more straight lines. In other words, in some cases the partition extends along at least one of the straight lines from the first side member to the second side member.

Those skilled in the art should appreciate that configuring the support structure 106 in this way can improve the structural integrity and increase the load-bearing capacity of the structural component 100. For example, forming the inner partition 112 so it extends at least partially along the intersecting lines 160 in FIG. 1D can reinforce the support structure 106 along those lines. As shown in the different cross-sections of FIGS. 1C-1E, the partition 110 can be formed so that it extends along many different straight lines in a variety of planes. Extending the internal partition 112 along multiple straight lines in this manner more distribute the internal stresses that are generated when the component 100 experiences a load. For example, referring to FIG. 1C, the inner partition 112 can be described as having many curved portions that include a support point 162. As shown throughout FIGS. 1C-1E, the internal partition 112 in this example includes many support points 162. Two or more of the depicted straight lines intersect at each of these support points 112, thus providing multidirectional reinforcement of the inner partition 112 at each point 162. Accordingly, providing the partition 110 with sections that run along many different straight lines can increase the load-bearing capacity of the component 100.

Referring to all of FIGS. 1A-1E, those skilled in the art will appreciate that, in this example, the inner partition 112 is configured, shaped and contoured to mimic a periodic minimal surface. More specifically, in this embodiment the inner partition 112 is configured to approximately follow the contours of a Schwarz P surface. Although this example and other examples described herein include partitions that are approximately shaped as a Schwarz P surface, it should be understood that embodiments are not limited to this specific surface configuration, nor even to a periodic minimal surface configuration.

As used herein, the term "approximately shaped" is used to indicate that a partition has a shape that closely follows the contours of the desired mathematical ideal, though some discrepancies may exist. For example, in some cases a structural component such as a container may be formed using a casting process. In such a case, the partition may be "approximately shaped" as a periodic minimal surface to the extent possible, and within conventional design tolerances associated with current casting or other manufacturing techniques. Also, in some cases a partition is approximately shaped as a type of surface in the sense that the partition closely follows the mathematical surface, though not exactly. This is because the ideal surface is usually thought to have an infinitely small thickness, while practical applications require some real thickness for the partition. Accordingly, the partition may be formed by following the ideal surface locate within the real thickness of the partition, such as at the midpoint of the partition's thickness.

Figure 2A:
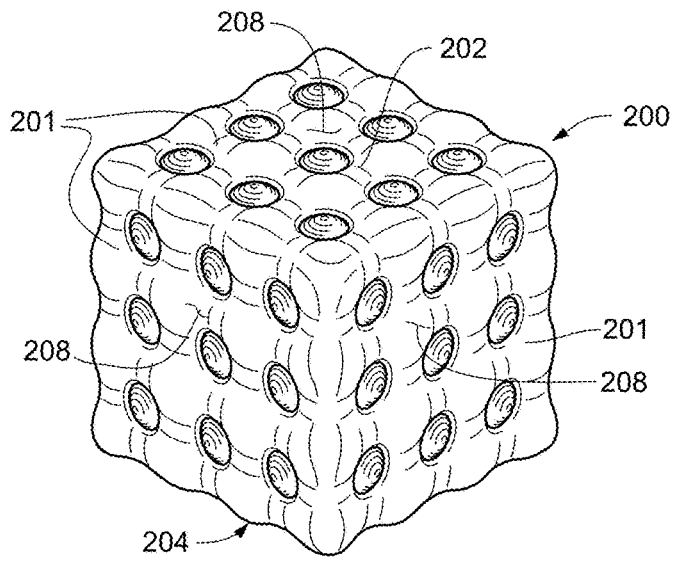
FIG. 2A is a perspective view of a container according to one embodiment.
Figure 2B:
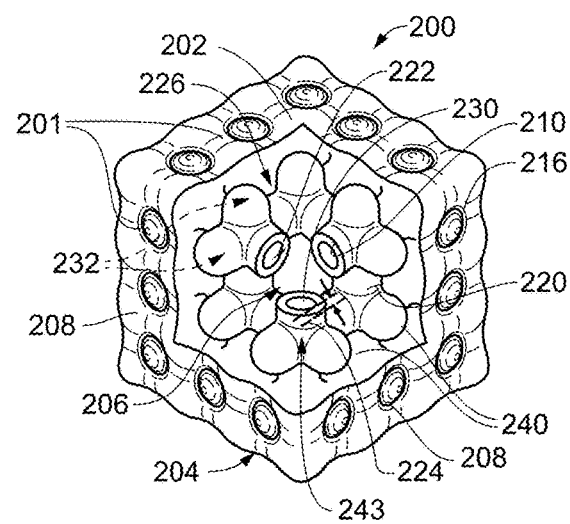
FIG. 2B is a perspective, cutaway view of the container of FIG. 2A.
Figure 2C:
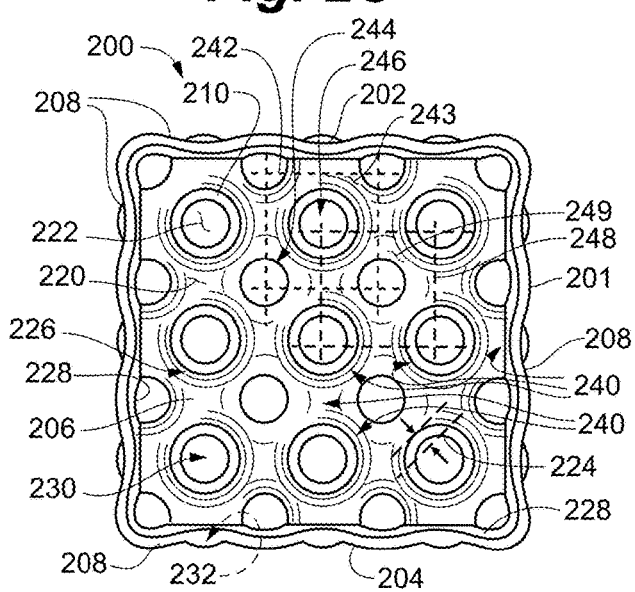
FIG. 2C is a cross-sectional view of the container of FIG. 2A.

Turning to FIGS. 2A-2E, some embodiments of the invention provide a structural component as a container 200. Referring to FIGS. 2A-2C, in this embodiment the container 200 has a cube-like configuration. FIG. 2A is a perspective view of the container 200, which shows a wall 201 that encloses the container 200 on all sides. Selected portions of the wall are referred to herein as wall portions for convenience. FIG. 2A depicts the container 200 as having at least a first wall portion 202 at the top surface of the container and a second wall portion 204 at the bottom surface (not shown) of the container 200. In this example the wall portions 202, 204 are defined as the entire top and bottom container surfaces, respectively, although this is not necessary and in some cases a container wall portion may be a smaller portion of the top or bottom walls or a portion of one of the side walls.

Figure 3:
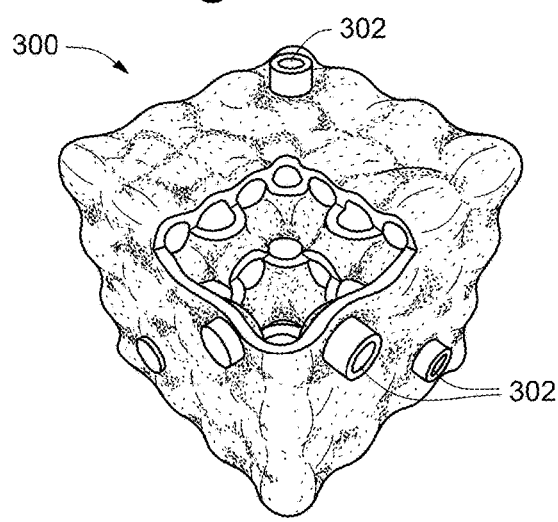
FIG. 3 is a perspective, cutaway view of a container according to one embodiment.

While the depiction in FIG. 2A can help from a conceptual standpoint, in many embodiments a container such as the container 200 will include one or more inlets, outlets, ports, and the like to provide access to the interior of the container. (FIG. 3, which will be discussed in more detail, provides one example of a container 300 that does include multiple ports 302.) In such cases, the wall of the container can be described as substantially enclosing the container because the ports (and possibly other openings) provide some limited and operational access to the container interior.

FIG. 2B is a cutaway view of the container 200, and FIG. 2C is a cross-section of the container 200, that each reveals an internal support structure 206 that extends between the first wall portion 202 and the second wall portion 204. In this case the support structure 206 extends between each of the other surfaces or faces 208 of the container 200 as well. The support structure 206 includes a partition 210, which in many ways is similar to the partition 112 described above with respect to FIGS. 1A-1E. For example, in this embodiment the partition 112 is shaped approximately like a Schwarz P surface, though this is not a requirement and other configurations are possible. In some embodiments, the partition 210 is substantially enclosed by the wall 201. As with the inner partition 112, the partition 210, and more generally, the support structure 206, defines multiple cells that are also enclosed by the wall 201. The partition 210 has a thickness 224 that extends between a first surface 220 and a second surface 222.

The first surface 220 of the partition 210 is a substantially continuous surface that defines a first space or cavity 226 within the container 200. The first cavity 226 is bounded by the first surface 220 and some inner surfaces 228 of the container wall 201. The second surface 222 defines a second space or cavity 230. The second cavity 230 is bounded, in this instance, by the second surface 222 and other inner surfaces 232 (referenced with dashed arrows) that may alternately be considered part of the outer wall 201, part of the support structure 206, or both. For example, as shown in FIG. 2B, a portion 216 of the support structure protruding from the center may be integral with and form a part of the container wall 201.

The partition 210 includes multiple curved portions 240 that form a number of cells within the support structure 206. As with the example of the structural component discussed above, the curved portions 240 position the cells into two sets of cells with an interlocking lattice arrangement. A unit cell in this embodiment has a cubic shape and encompasses a multi-curved portion 243 of the partition 210. FIG. 2C depicts a first cell 242 that intersects the inner partition 212 at symmetrical locations to enclose the multi-curved portion 243. As with the embodiment described in FIGS. 1A-1E, the multi-curved portion 243 in this embodiment fits within the cubic boundary of the first cell 242 and includes a larger central volume that narrows to six cylindrically-shaped openings, one opening associated with each of the faces of the cubic cell.

The multi-curved portion 243 of the partition generally divides the unit cell 242 into a first volume 244 that is adjacent to the first surface 220 and thus part of the first cavity 226, and a second volume 246 that is adjacent to the second surface 222 and thus part of the second cavity 230. FIG. 2C also illustrates a second unit cell 248 that is diagonally offset from the first unit cell 242. This unit cell 248 and other cells like it intersect and encompass parts of the partition 210 to define multi-curved portions 249 in much the same way that cell 242 intersects and encompasses a portion of the partition 210.

Figure 2D:
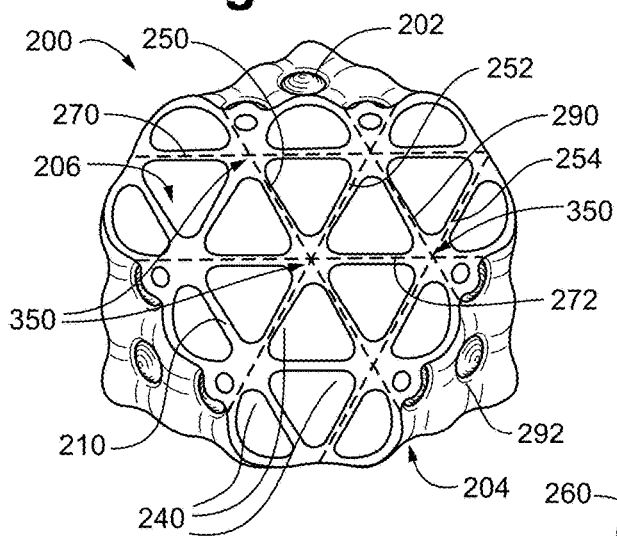
FIGS. 2D and 2E are cross-sectional views of the container of FIG. 2A that illustrate a partition extending at least partially along multiple straight lines according to one embodiment.
Figure 2E:
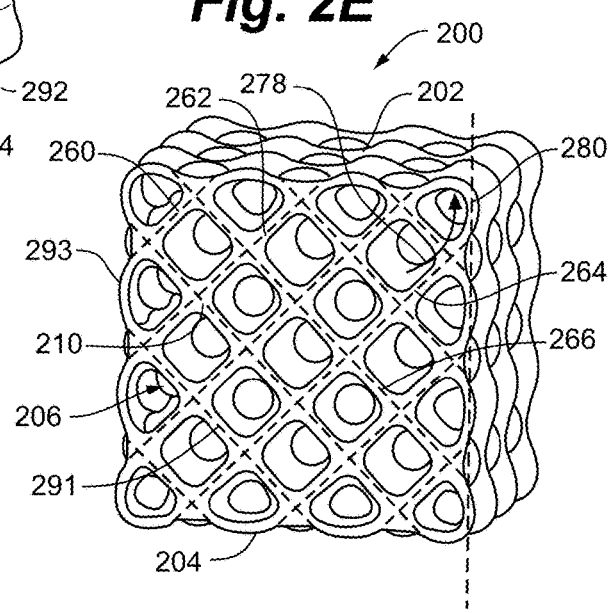

FIGS. 2D and 2E are cross-sectional views of the container 200 taken along different planes of intersection. The cross-sections show how the support structure's partition 210 extends between the first wall portion 202 and the second wall portion 204 of the container 200. The partition 210 is connected to each of the wall portions 202, 204 and travels along multiple lines and curves, about and around multiple cells and volumes, as it extends between the first and the second wall portions 202, 204. The parts of the partition 210 shown in FIGS. 2D and 2E, though, also extend along multiple straight lines between the first and the second wall portions 202, 204. For example, FIG. 2D illustrates how the partition 210 extends along a first straight line 250, a second straight line 252, and a third straight line 254, while also extending at least part of the way between the first and the second wall portions 202, 204. In addition, FIG. 2E depicts the partition 210 extending along multiple straight lines 260, 262, 264, and 266 as the partition extends by varying amounts between the first wall portion 202 and the second wall portion 204.

As shown in FIG. 2D, as the partition 210 extends between the first wall portion 202 and the second wall portion 204 along the straight lines 250, 252, 254, the direction of the extension, i.e., of the straight line, is generally toward or away the first or second wall portions 202, 204. Accordingly, in one sense the partition 210 extends between the first and second wall portions in that it extends toward and away from the wall portions as it follows the straight lines 250, 252, 254. In some embodiments, a container partition (and also the partition of any structural component) may extend along a straight line that does not intersect with one or both wall portions or side members because the straight line is parallel or skew with respect to the physical size of the side members. For example, FIG. 2D illustrates how the partition 210 follows first and second straight lines 270, 272 that appear to be parallel to the first and second wall portions 202, 204. At the same time, that part of the partition 210 is also extending between the first and second wall portions 202, 204, although not toward or away from the wall portions. FIG. 1C also illustrates how the inner partition 112 of the core structure 100 extends along the straight line 154 while also being between the first side member 102 and the second side member 104. Accordingly, for purposes of this disclosure, a partition such as in these examples is still considered to be extending between two side members or between two wall portions because the partition is actually in a physical location between the positions of the first and second wall portions/side members.

As previously discussed with reference to FIGS. 1A-1E, in some embodiments the partition of a structural component, such as a container, may fully extend between side members or wall portions while also extending along one or more straight lines. In other words, in some cases the partition extends along at least one of the straight lines from the first side member to the second side member. As shown in the figures, in many cases the partition 210 within the container 200 extends along a straight line for a little, some, most, or nearly all of the way between the first wall portion 202 and the second wall portion 204. For example, in the cross-section of FIG. 2D, the partition 210 only extends a relatively small distance along the straight line 260 away from the first wall portion 210. In another example, the partition 210 extends along the straight line 264 from the second wall portion 204 to nearly the first wall portion 202 when the partition 210 angles away 278 from the straight line 264 along line 280 to connect to the first wall portion 202.

Figure 5:
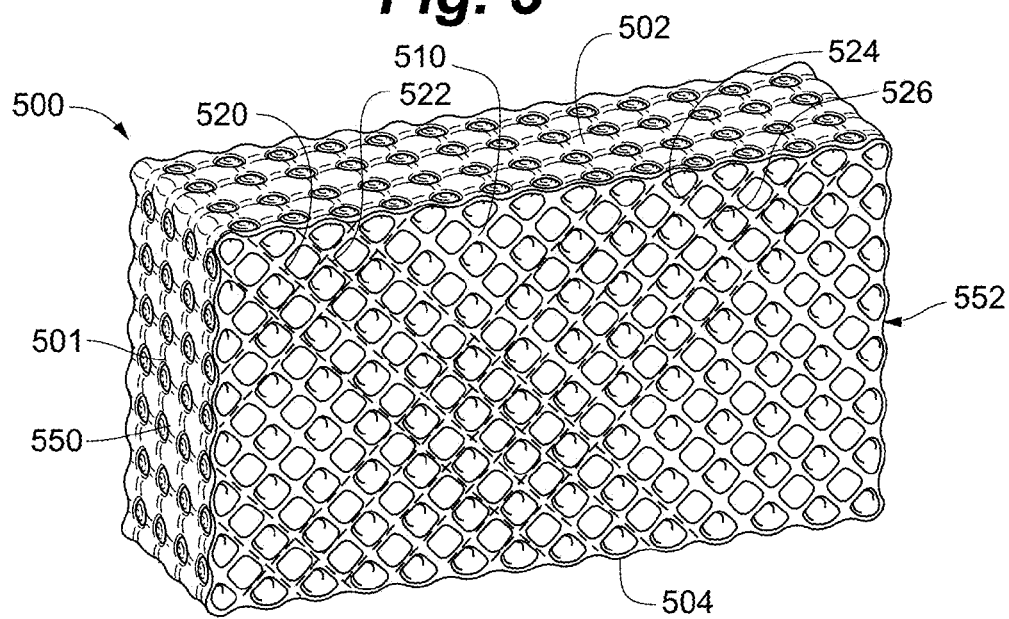

Although not shown in FIGS. 2A-2E, in some cases the partition of a structural component, such as a container, may fully extend between wall portions on opposing sides of a container while also extending along a straight lines. FIG. 5 is a perspective, cross-sectional view of another container 500 in which a partition 510 does fully extend between opposing wall portions 502, 504 while also extending along multiple straight lines 520, 522, 524, and 526, to name a few. Accordingly, the partition 510 extends along each of the lines from one of the wall portions to the other wall portion. Configuring the container 500 and the partition 510 to fully extend between the opposing wall portions 502, 504 can increase the structural integrity of the container 500, as discussed above with respect to structural components more generally.

FIG. 5 also illustrates an example in which the partition 510 can be described as extending along multiple straight lines between wall portions while also extending toward and away from the wall portions without intersecting the wall portions. As an example, container 500 also includes a wall portion 550 and another wall portion 552, in addition to wall portions 502 and 504, as well as many other potentially relevant, but undesignated, portions of the wall 501. With respect to the wall portions 550, 552, it can be seen that the partition 510 extends along many different straight lines (for example, lines 520, 522, 524, and 526) without intersecting wall portions 550 and 552. Even so, the partition 510 is still extending between the wall portions 550, 552 as it follows each of these straight lines.

In some cases a partition forming part of the support structure may also, or instead, extend along one or more straight lines between two wall portions that share a common edge. For example, returning to FIGS. 2D and 2E, the partition 210 is shown as extending along a straight line 290 in FIG. 2D and a straight line 291 in FIG. 2E. In the first case, the partition 210 is connected to the first wall portion 202 and to a third wall portion 292 that shares a common edge (not shown) with wall portion 202. In FIG. 2E, the partition 210 is connected to the second wall portion 204 and to a fourth wall portion 293 that is adjacent to the wall portion 204. In each case, the partition 210 extends along the straight line between two wall portions and also from one of the wall portions to the other wall portion.

Figure 4:
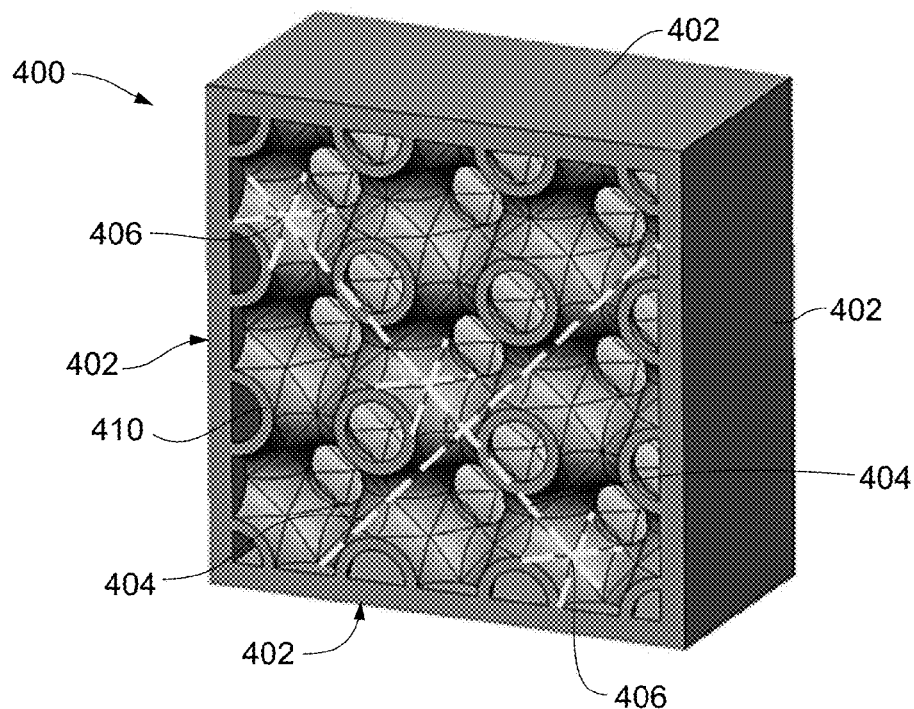
FIGS. 4 and 5 are cross-sectional views of different containers according to some embodiments.

Continuing to refer to FIGS. 2D and 2E, as well as FIG. 2A, each of the wall portions 202, 204, 292, and 293 are part of the container wall 201 and are located on different faces 208 of the cube-like container 200. As most clearly shown in FIG. 2A, each face 208 of the container 200 in this example is configured as a generally planar surface. The term "generally planar" is used herein to refer to surfaces, such as the container faces 208, that have an approximately planar configuration from a macro perspective or scale, but that may not actually be formed to have an ideal, mathematically planar surface. As just one example, the wall 201 of the container 200 includes a number of generally planar surfaces, but each surface or face 208 includes many different undulations 257 and surface contours that do not appear planar when viewed on a micro scale or from a micro perspective. In this case the surface undulations 257 correspond to the periodic minimal surface configuration of the support structure 206, though other surface contours can conceivably be incorporated for other reasons. In addition, surface contours and undulations are not necessarily included in some embodiments. For example, FIG. 4 is a perspective, cross-sectional view of a container 400 that includes multiple faces or sides 402 that are provided with a smooth surface. (The straight lines 404 in FIG. 4 also indicate that the container's partition 410 also follows multiple straight lines and includes support points 406 as described elsewhere herein.)

As with a structural component more generally, those skilled in the art should appreciate that configuring the partition 210 to extend along multiple straight lines as shown in FIGS. 2A-2E can improve the structural integrity and increase the load-bearing capacity of the container 200. For example, forming the partition 210 so it extends at least partially along the intersecting lines can reinforce the support structure along those lines and at the intersection point of the lines. Referring to FIG. 2D, the partition 210 includes multiple curved portions 240 as discussed above with respect to FIG. 2C. In some cases one or more of the curved portions 240 include a support point 350. In FIG. 2D, multiple support points 350 are depicted at the location of corresponding curved portions, although in this embodiment the support points 350 are more specifically located within the thickness of the curved portions. Two or more of the depicted straight lines intersect at each of these support points 350, thus providing multidirectional reinforcement of the partition 210 at each point 350. Accordingly, providing the partition 210 with portions that follow many different straight lines can increase the load-bearing capacity of the container 200.

Figure 6A:
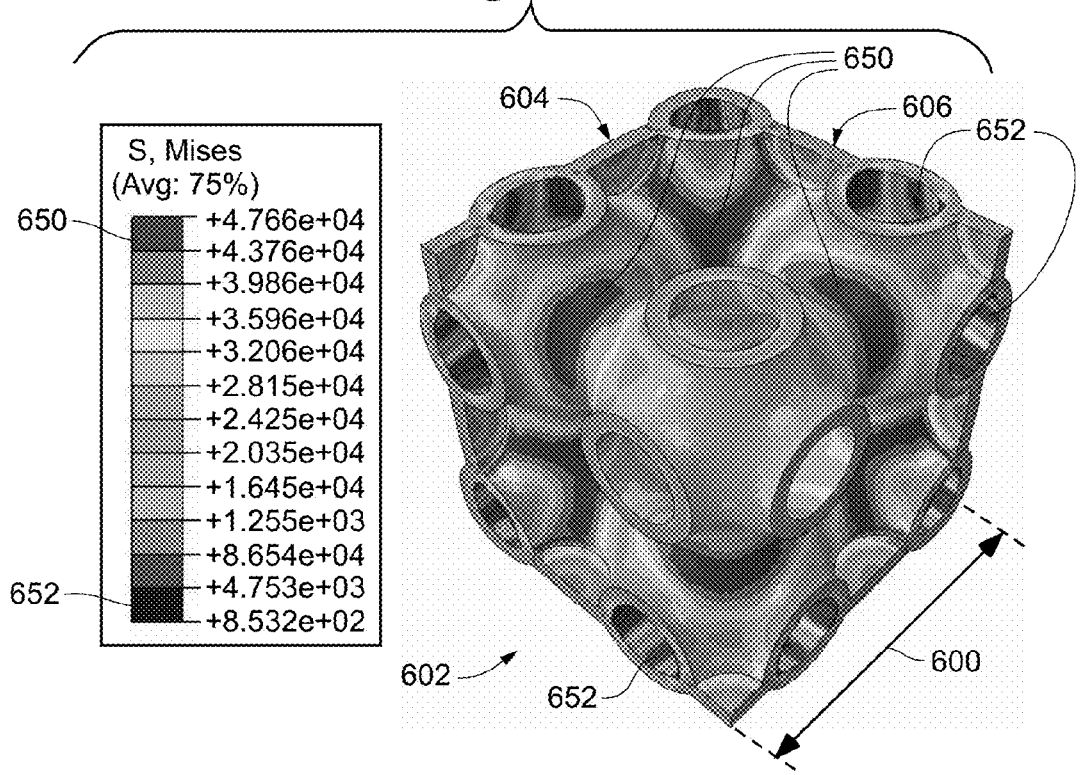
FIGS. 6A and 6B are perspective views illustrating stress distributions of a portion of different containers according to some embodiments.
Figure 6B:
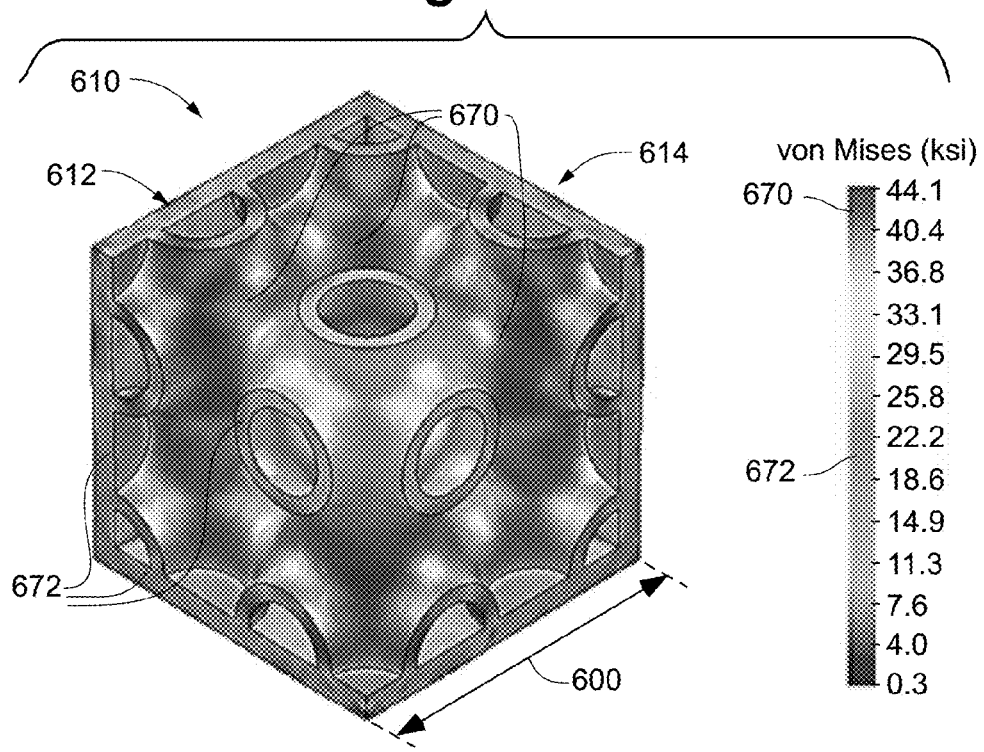

Referring to FIGS. 6A and 6B, and to the other figures depicting unit cells, in some cases each cell can be described as having a cell size 600, which is approximately the length of a cell in the illustrated examples. In some cases it may be desirable to provide the cells of a container with a certain size that is based on other properties of the container. According to one embodiment, at least some of the cells of a container have a size that is related to the thickness of the support structure's partition, as well as to the burst pressure of the container and the yield strength the container's material. In some cases, for example, the cell size is approximately proportional to the thickness of the container's partition and also to the container's burst pressure, and approximately inversely proportional to the yield strength of the container material. According to some embodiments, the cell size, partition thickness, burst pressure, and yield strength are related according to the following relationship:

$$\frac{\text{cell size}}{\text{partition thickness}} = C \times \frac{\text{Burst Pressure of Container } (psi)}{\text{Yield of Linear Material } (ksi)}$$

in which C is an empirically-derived constant.

FIGS. 6A and 6B are perspective views illustrating the results of a stress analysis calculated for two different container configurations. FIG. 6A depicts a single unit cell 602 of a container such as one of those illustrated in FIGS. 2A-2E, which includes outer faces 604, 606 having surface undulations as shown in FIG. 2A. FIG. 6B depicts a single unit cell 610 of a container such as container 400 shown in FIG. 4, which includes substantially smooth and planar outer faces 612, 614. The stress test results are indicated in the form of surface contours showing predicted stress levels for different portions of the unit cells in Mises or ksi. As can be seen, each model predicts stress levels that are generally distributed across the surfaces of the partitions. This analysis indicates that embodiments of the invention are likely to withstand greater burst pressures and other forces than containers that include sharp edges and other discontinuities about which high levels of stress can form. Referring to the figures, the unit cell 602 generally predicts a high stress of $4.766 \times 10^4$ Mises at points 650 and a low stress of approximately $8.532 \times 10^2$ at points 652. Likewise, the unit cell 610 generally predicts a high stress of 44.1 ksi at points 670 and a low stress of approximately 22.2 ksi at points 672.

Figure 7:
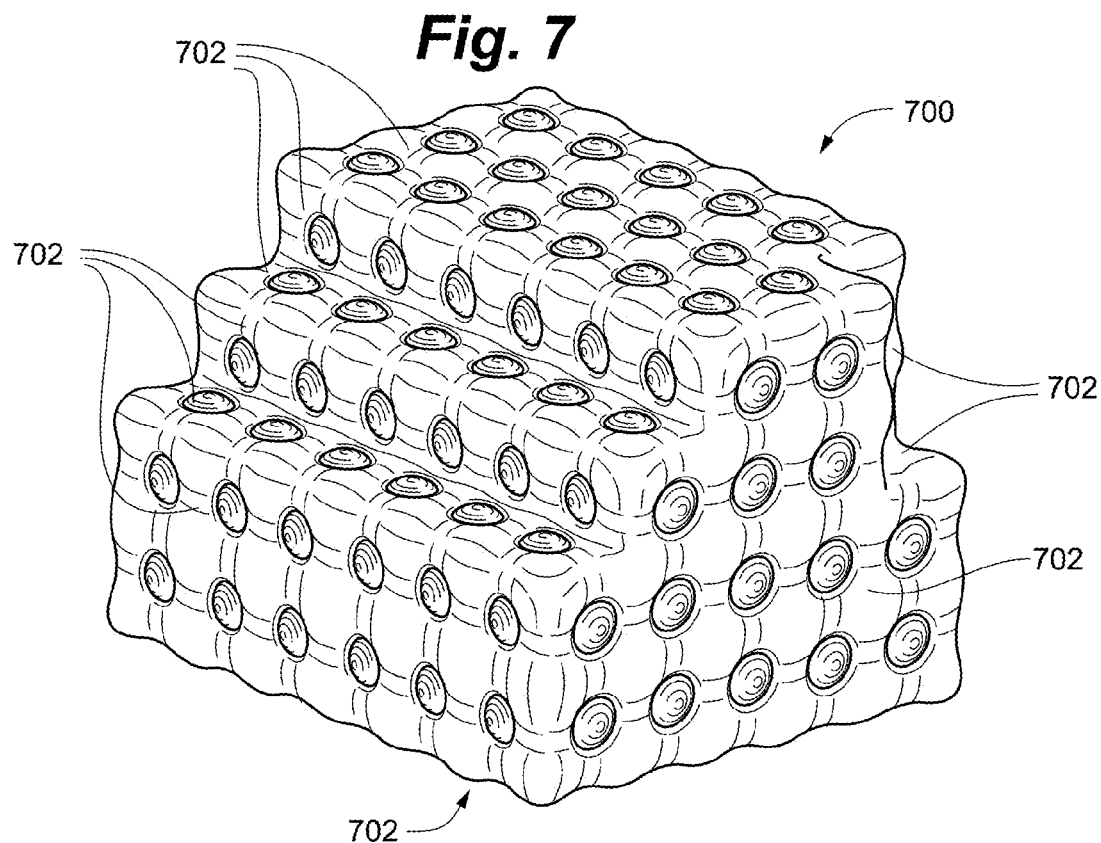
FIG. 7 is a perspective view of a container according to one embodiment.

Returning to FIGS. 2A-2E, the container 200 has the configuration of a cube, but it should be appreciated that containers with many different shapes may be provided according to the invention. As just one possible example, FIG. 7 is a perspective view of a container 700 that includes many different faces 702 arranged approximately at right angles to form the container 700. Of course this is just one example and containers with other configurations may also be provided. In some cases a container may be provided with a generally cylindrical outer wall, while also incorporating a support structure having multiple cells arranged in a lattice network.

Figure 9:
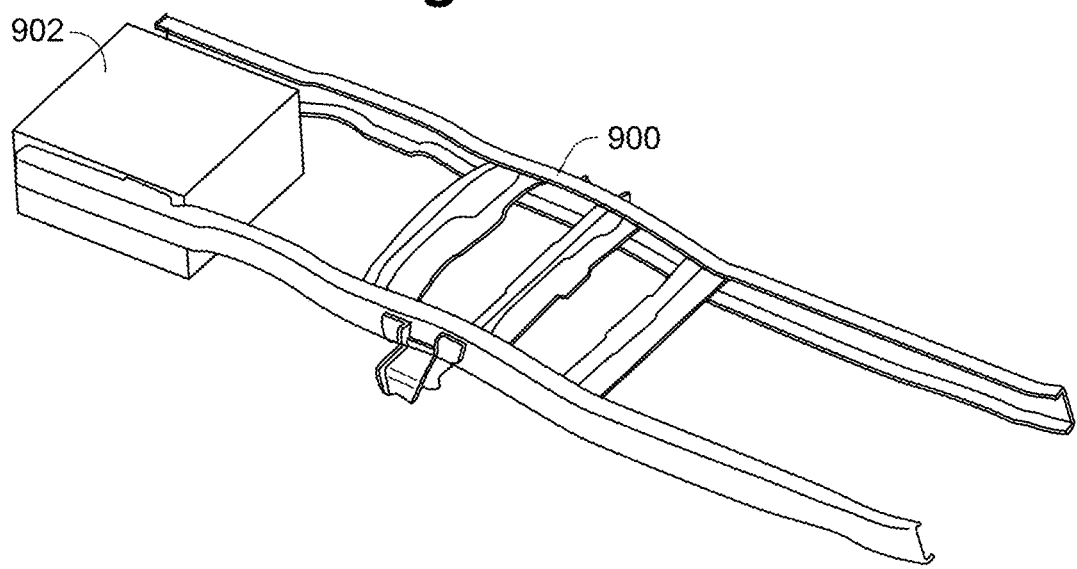
FIG. 9 is a perspective view of a container in combination with a vehicle frame according to an embodiment.
Figure 10:
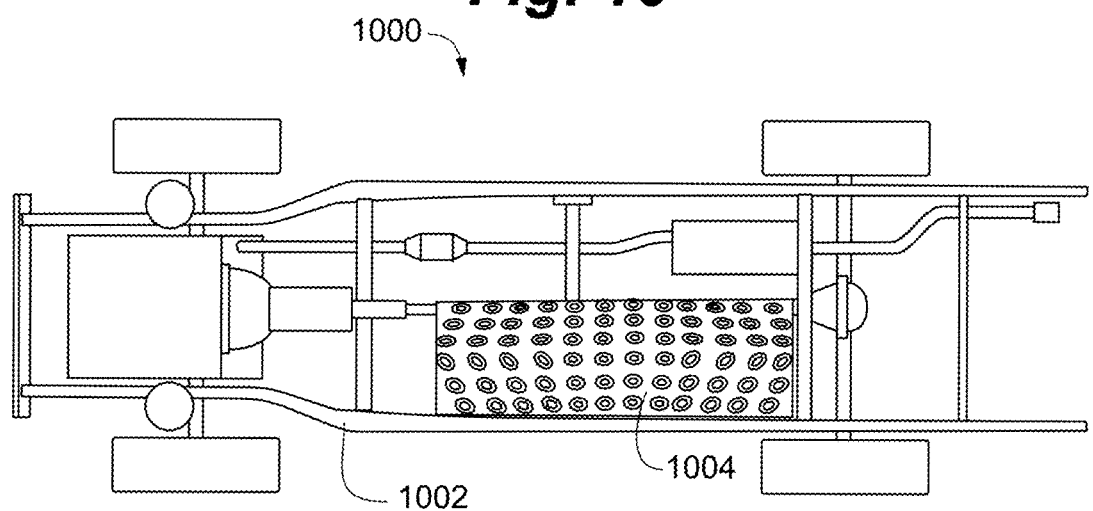
FIG. 10 is a bottom view of a vehicular system including a container for storing fuel according to an embodiment.

Although some embodiments of the invention may provide cylindrical or curved outer surfaces, configuring a container with a geometry as in FIG. 7, or with a simpler rectilinear geometry of a cube or rectangular solid, provides an advantage in conforming the outer shape and volume of the container to fit in a variety of locations that may not be suitable for a cylindrical tank. Turning to FIGS. 9 and 10, for example, in some cases a container can be specifically configured with a rectangular shape so that it can be more easily incorporated into the design of a vehicle. FIG. 9 is a perspective view of vehicle frame 900 that is connected with a container 902 that is shaped and sized to fit within the frame 900. Containers that are limited to cylindrical and curved outer walls are often difficult to efficiently position with respect to a vehicle frame and in many cases may need to be located in a less desirable area of a vehicle, such as a trunk or the bed of a truck. FIG. 10 is a bottom view of a vehicular assembly 1000 that includes a truck 1002 that has a fuel system that includes a container 1004 provided according to embodiments of the invention. The truck's fuel system is coupled with container 1004, which can store a fuel such as conventional gasoline and diesel fuels, and also compressed natural gas as well as other possible fuels having a fluid state. Accordingly, in some embodiments a method for storing a fluid, such as compressed natural gas, under pressure can include steps of introducing the fluid under pressure through an inlet into the container 1004 and then closing the inlet until it is desirable to remove some or all of the fluid from the container 1004.

Figure 11A:
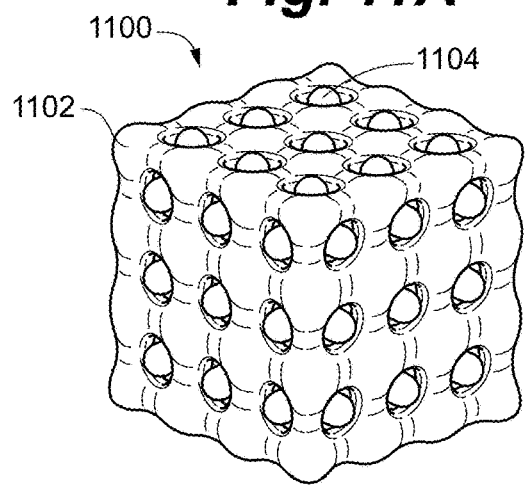
FIG. 11A is a perspective view of a core structure according to one embodiment.
Figure 11B:
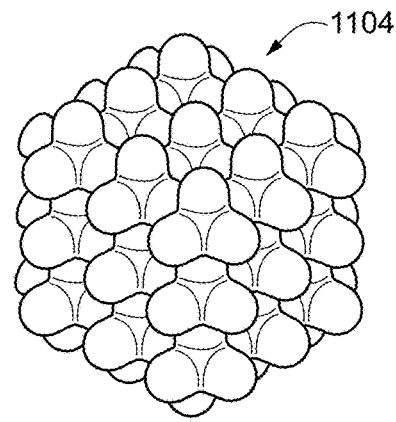
FIG. 11B is a perspective view of a portion of the core structure of FIG. 11A.

Turning to FIG. 11A, in some embodiments a container or structural component can be formed using a core structure such as the core 1100 shown in FIG. 11A. The core 1100 includes first and second portions 1102, 1104, that are interlocking in a lattice arrangement corresponding to the cells that are to be formed in the structural support of the resulting container. FIG. 11B provides a clearer view of the second core portion 1104 apart from the first core portion 1102. As can be seen, the second core portion 1104 is configured as a Schwarz minimal P surface, and is thus capable of forming containers and structural components such as those described above with respect to FIGS. 1A-2E.

Figure 12A:
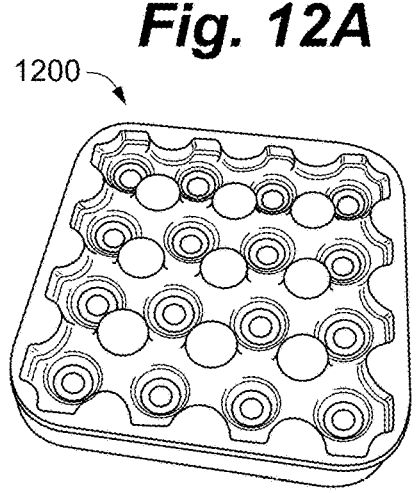
FIGS. 12A and 12B are perspective views of a mold and corresponding portion of a core structure, respectively, according to an embodiment.
Figure 12B:
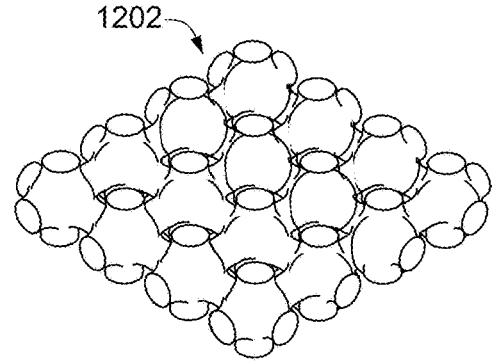
Figure 13:
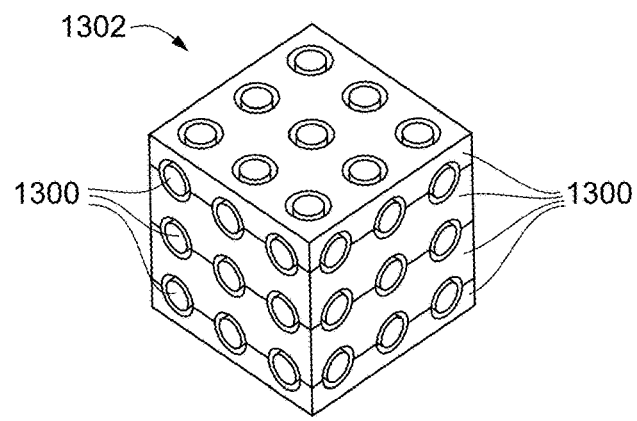
FIG. 13 is a perspective view of a core structure according to an embodiment.

According to some embodiments, a core structure for forming a container or structural component can be manufactured using a casting technique. FIG. 12A is a perspective view of a mold 1200 that can be used in part to cast the core structure portion 1202 shown in perspective in FIG. 12B. Multiple core structure portions similar to and the same as portion 1202 can be stacked in alternating layers to build a core structure. As one example, FIG. 13 is a perspective view of multiple layers 1300 that have been stacked to form a core structure 1302 that can be used to cast a container such as the container 400 in FIG. 4.

Figure 14A:
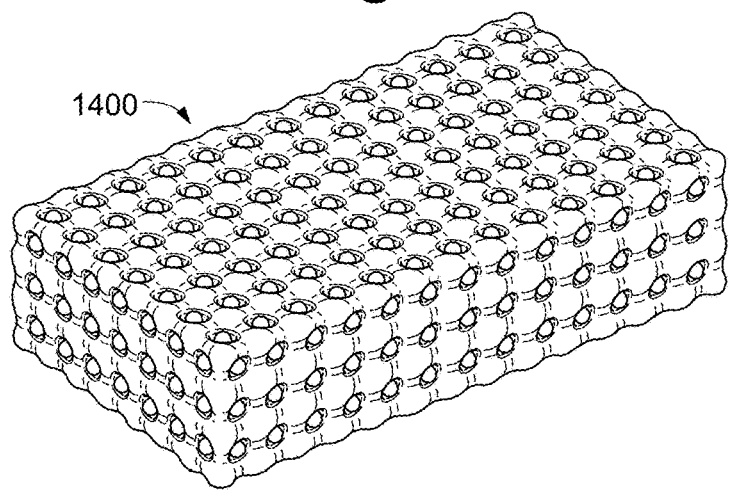
FIG. 14A is a perspective view of a core structure.
Figure 14B:
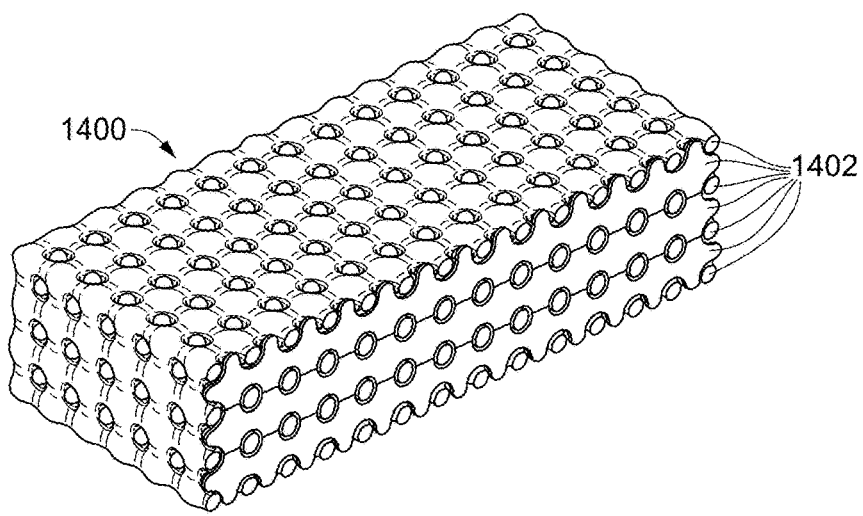
FIGS. 14B and 14C are cross-sectional views of the core structure according to an embodiment.
Figure 14C:
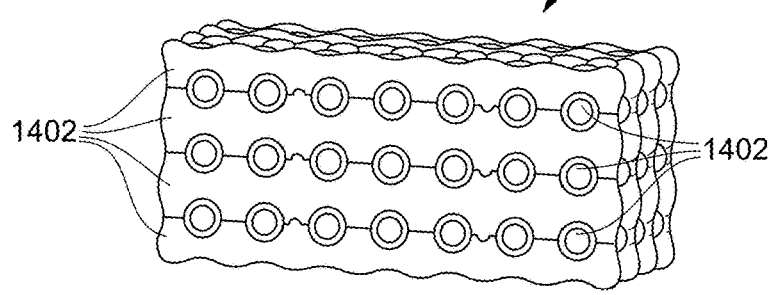
Figure 15:
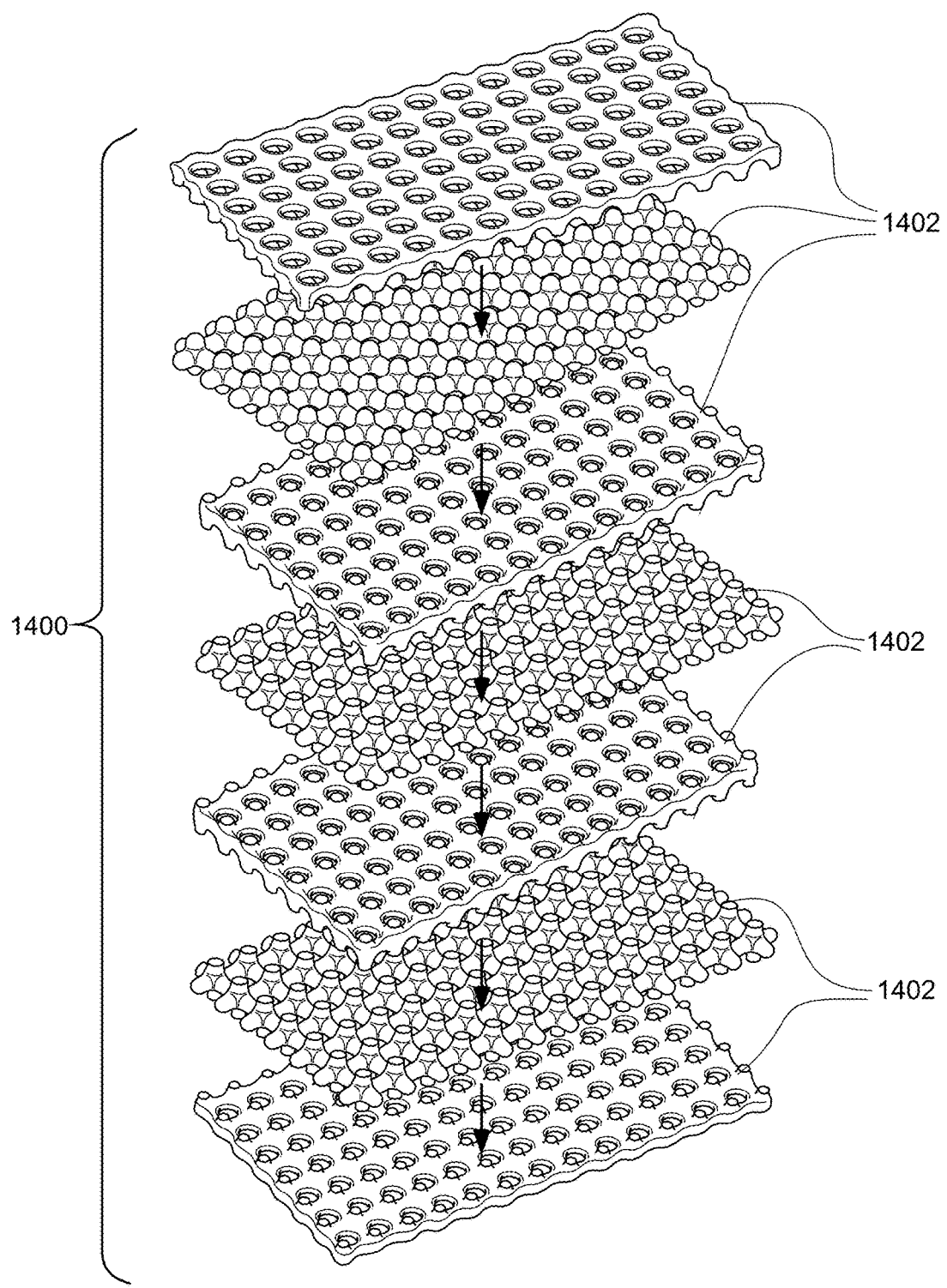
FIG. 15 is an exploded view of a core structure according to an embodiment.

Another example of a core structure 1400 is provided in FIG. 14A. As depicted, the core structure 1400 is similar in most respects to the core shown in FIG. 12A, although the core structure 1400 has different overall dimensions. FIGS. 14B and 14C are cross-sections of the core structure 1400 that show the multiple core structure layers 1402 that have been stacked to form the core structure 1400. FIG. 15 provides an exploded view of the core structure 1400, illustrating the stacking of the multiple layers 1402.

In some embodiments it is contemplated that two or more preforms can be connected or arranged (e.g., stacked) together to form a network or system of preforms. Such an arrangement of preforms is also referred to as a casting insert or a core structure herein since the preforms are inserted into the mold during the casting process and are used to form one or more compartments at the core of the structural component.

The preforms are arranged and connected to form a core structure. The preforms are connected to one another in a spaced-apart relationship by the connecting tube, which in this case also provides an inter-compartmental flow path extending between preforms and ultimately between compartments formed in the casted container. As such, interconnected preforms also define interconnected compartments within a container. In some embodiments, inter-compartmental flow paths are conduits or ducts configured for fluid communication between interconnected compartments.

In certain embodiments, support tubes can include an impermeable external surface for preventing infiltration of the molten material into the support tube and corresponding flow path. For example, the support tube can be formed from a hollow rod for connecting adjacent preforms to one another.

In some cases, rods include fill and egress holes, and extend through a network of preforms, thus forming a lattice-type structure of rods. In some cases the rods may be coated with a barrier layer or be otherwise impermeable. After forming such a container and removing the preforms (or maintaining the preforms), the rods may be left within the container, connecting adjacent compartments such that the fill and egress holes within the network of rods/tubes provide a desired inter-compartmental flow path between compartments within the container.

In some embodiments, one, two, or more preforms can be placed in a spaced-apart relationship along one single tube/rod so as to define one or more flow paths between adjacent preforms. Two or more preforms positioned adjacent one another on a single rod can be considered as pieces arranged on a skewer and/or arranged as sheesh-kebob.

In certain embodiments, the tubes may be removed during or after casting, though in some cases the tubes can remain within the preform(s) to increase the strength of the final casted product. In some embodiments in which the tubes are not impervious, the external surface of the tubes can be coated with an impermeable barrier so as to prevent the infiltration of the molten material into the tube and thereby hinder fluid communications between interconnected compartments.

Further, in certain embodiments, only adjacent preforms may be connected to one another with one single bar extending between opposed sides of the adjacent preforms. In some embodiments, inter-compartmental flow paths are defined by an elongated hollow conduit, e.g., a tubing. In some embodiments, the conduit may have an impermeable exterior surface. In certain embodiments, the conduit may have openings through its external surface so as to facilitate fluid communications between the hollow of the conduit and the preform through which it extends. The ends of the conduit may be open or closed.

In some embodiments, the structural component can be a container that includes a solidified molten material surrounding and encapsulating a layer of compartments that have been formed using a core structure. The structural component can include multiple rods extending from the casted material. The rods may align and connect a grid of nine preforms for the structural component. During the casting process, the preforms resist infiltration by the molten material, thus forming the compartments within the solidified material. In some cases the preform material may then be removed, or optionally retained within the compartments. For example, in some cases a water or other fluid rinse could be introduced into the compartments through the rods in order to dissolve and/or rinse away preforms made from salt, sand, or another similar substance. In some cases the preforms could be formed from a carbon material that is then oxidized and burned away by sufficiently heating the finished casting.

Applicant's related applications, including U.S. patent application Ser. No. 14/176,093, filed Feb. 8, 2014, International PCT application US2014/015454, filed Feb. 8, 2014, International Patent Application No. PCT/US2013/053877, filed Aug. 6, 2013, which claims the benefit of U.S. Provisional Patent Application No. 61/680,070 filed Aug. 6, 2012, and also claims the benefit of U.S. Provisional Patent Application No. 61/850,087 filed Feb. 8, 2013, and U.S. Provisional Patent Application No. 61/801,233 filed Mar. 15, 2013, provide examples of core structures, containers and structural components that can in some embodiments be formed using a method of casting. The content of each of the above-captioned applications is hereby incorporated by reference in this disclosure.

Figure 16A:
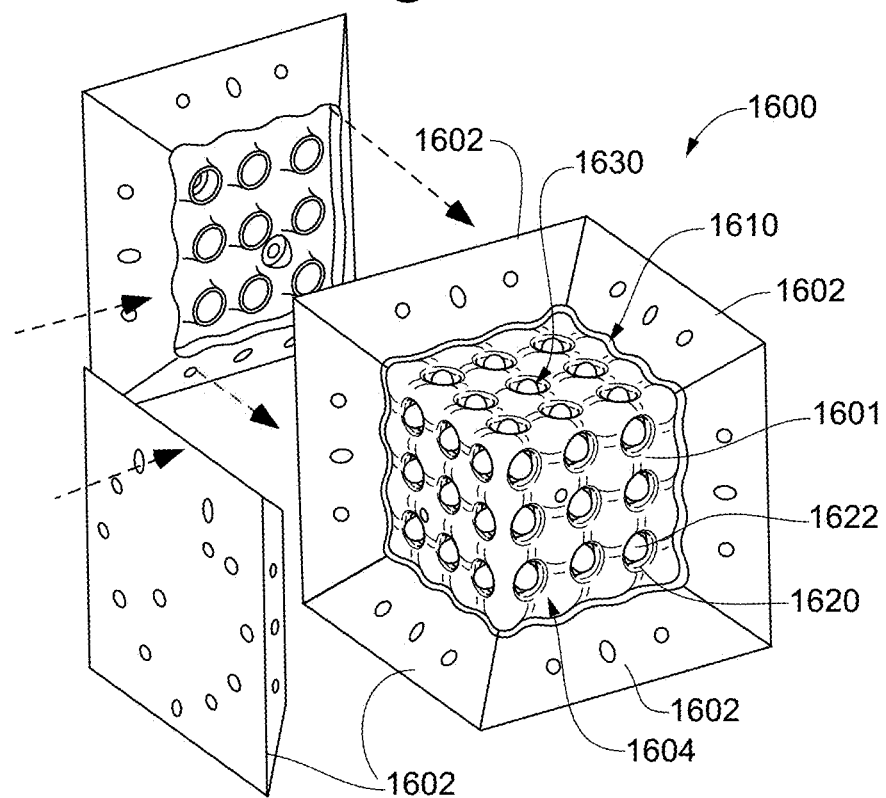
FIG. 16A is an exploded view of a mold and core structure according to an embodiment.
Figure 16B:
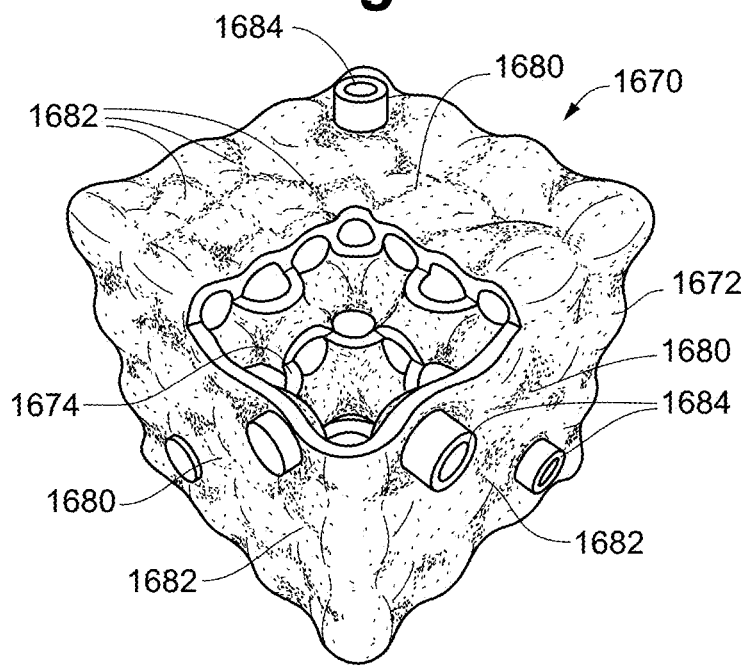
FIG. 16B is a perspective, cutaway view of a container that can be formed in part using the mold and core structure of FIG. 16A according to one embodiment.

FIG. 16A provides an exploded view of a mold 1600 and core structure 1601 that can be used to cast a container such as the finished container 1670 shown in perspective view in FIG. 16B. The mold 1600 generally includes multiple walls 1602 that when combined define a cavity 1604. The core structure 1601 can be positioned in the cavity 1604, which defines a first material flow path 1610 between an exterior of the core structure and the walls 1602 of the mold 1600. As shown, the core structure 1601 is similar to the core structure 1100 depicted in FIG. 11A, and includes interlocking first and second portions 1620, 1622 that define a second material flow path 1630 between the first portion 1620 and the second portion 1622.

An external container wall 1672 can be formed by introducing a material, such as a metal, into the first material flow path 1610. The partition 1674 of the container 1670 and the cells within the container can then be formed by introducing the same material into the second material flow path 1630. Doing so forms the partition 1674 as an approximately shaped periodic minimal surface (in this example, a Schwarz P surface) that defines a lattice arrangement for the cells. After introducing the necessary amount of the material into the flow paths 1610, 1630, the material is allowed to solidify, the walls 1602 of the mold 1600 are removed, and the container 1670 is removed. The resulting container 1670 has a generally cube-like configuration with generally planar faces 1680 that include surface undulations 1682 corresponding to undulations provided in the walls 1602 of the mold 1600. Additional machining of the container 1670 can provide one or more ports 1684 through the container wall that provide access to the two distinct cavities formed within the container on opposite sides of the partition 1674.

Returning to FIGS. 11A-15, in some cases the core structures are formed with one of a variety of materials. Examples of materials and techniques for forming some preforms are disclosed in U.S. Pat. No. 8,075,827, titled "Variable-Density Preforms", issued Dec. 13, 2011, the entirety of which is incorporated herein by reference. As just a few possible, but not exhaustive, examples, the core structures can be formed with preform layers that include one or more of carbon graphite fibers, silicon carbide, SAFFIL®, and Nextel™ 610. In some cases a preform can be made from salt, sand, resins, foam, wax, or any other suitable coring material.

According to some embodiments, a core structure can optionally be made from a material or composition that can be removed from a container after casting is complete. For example, a core structure may be made from salt or sand. In some cases such a preform may be made using a three dimensional printing process in which salt, sand, and/or another suitable material is built up or etched away using a computer controlled printing machine. After surrounding such a preform with molten material, and allowing the molten material to solidify, the preform material may be removed to form open compartments or voids within the solidified material.

In some cases a core structure may dissolved (e.g., in the case of salt) and/or rinsed away (e.g., sand) with a fluid such as water through one or more fluid flow paths in the container. According to some embodiments, a core structure can be formed from a material that can be disintegrated or eliminated by heating so as to define compartments that are empty. For example, in some cases a core structure may have a composition including carbon or graphite fibers. After casting a container, the container and included core structure can be heated (e.g., fired) in an oxidizing environment so as to form carbon dioxide that can escape through one or more flow paths in the container.

Figure 8:
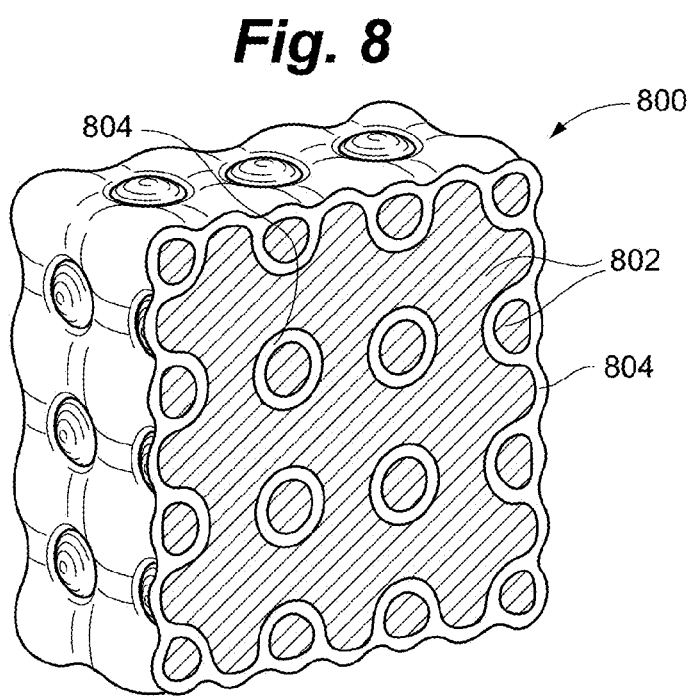
FIG. 8 is a cross-sectional view depicting a core structure material within a container according to an embodiment.

In certain embodiments, a core structure can have a composition that is permeable and/or porous, thus enabling the preform or a portion of the preform to remain within the container after casting and optionally during use. FIG. 8 is a cross-section of a container 800 that includes a permeable core structure 802 still within the partition 804. In this situation cells or compartments within the cast container may be formed simply by portions of the core structure displacing the molten material until solidification to create spaces within the container free of the molten material. Thus, the core structure portions may remain within the cast structural component and form part of the compartments within the casting. As just one possible example, core structures with sorbent capabilities can be used to form compartments within a pressurized gas tank such as a compressed natural gas (CNG) tank. In some cases a core structure could be formed from a graphite-based fiber preform that adsorbs methane from compressed natural gas stored in a container.

According to some embodiments, a core structure may also remain within a container or other structural component post-casting if the preforms add any other desired functionality to the compartments and/or structural component. In certain embodiments, for example, a core structure may be left within a structural component for additional structural properties such as absorption of force as in the case of ballistic and other uses.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

What is claimed is:

1. A structural component comprising:
   an external wall that includes
      a first side member, and
      a second side member; and
   a support structure integrally formed with the external wall, the support structure comprising a single, continuous partition connected to the first side member and the second side member and extending between the first side member and the second side member at least partially along a plurality of straight lines, the partition comprising a thickness and a plurality of curved portions that form a plurality of cells;
one or more ports extending through said external wall;
wherein the support structure is integrally formed with the external wall using a mold,
wherein the structural component is configured as a compressed fluids container,
wherein the one or more ports provide access to an enclosed interior of the container,
wherein the partition further comprises a first surface and a second surface with the thickness of the partition extending between the first and the second surfaces,
wherein the first surface and the external wall define a first contiguous cavity and the second surface and the external wall define a second contiguous cavity, and
wherein the first and second cavities are two distinct cavities formed within the container on opposite sides of the partition.

2. The structural component of claim 1, wherein the partition extends along at least one of the straight lines from the first side member to the second side member.

3. The structural component of claim 1, wherein at least one of the curved portions comprises a support point, and wherein at least two of the straight lines intersect at the support point.

4. The structural component of claim 3, wherein the partition is approximately shaped as a periodic minimal surface defining a lattice arrangement for the plurality of cells.

5. The structural component of claim 4, wherein the partition is approximately shaped as a Schwarz P surface.

6. The structural component of claim 1, wherein the partition separates the first contiguous cavity from the second contiguous cavity.

7. The structural component of claim 1, wherein the partition comprises a solidified material with a shape corresponding to a material flow path within a core structure used to form the structural component.

8. The structural component of claim 1 further comprising compressed natural gas stored in an enclosed interior of the container.

9. A compressed fluids container comprising:
an internal support structure defining a plurality of cells; and
an external wall integrally formed with the internal support structure and enclosing the internal support structure and the plurality of cells;
one or more ports extending through said external wall providing access to an enclosed interior of the container defined by the external wall;
wherein the external wall is integrally formed with the internal support structure using a mold;
wherein the external wall comprises a first wall portion and a second wall portion;
wherein the internal support structure comprises a partition connected to the first wall portion and the second wall portion, the partition extending along a plurality of straight lines at least part of the way between the first wall portion and the second wall portion, the partition comprising a thickness and a plurality of curved portions that form the plurality of cells;
wherein the compressed fluids container defines at least a first contiguous cavity and a second contiguous cavity separated from the first contiguous cavity by the partition; and
wherein the first and second cavities are two distinct cavities.

10. The container of claim 9, wherein the partition extends along the plurality of straight lines from the first wall portion to the second wall portion.

11. The container of claim 9, wherein each of the plurality of curved portions comprises a support point at which at least two of the straight lines intersect.

12. The container of claim 11, wherein the partition is approximately shaped as a periodic minimal surface defining a lattice arrangement for the plurality of cells.

13. The container of claim 12, wherein the partition is approximately shaped as a Schwarz P surface.

14. The container of claim 13, wherein the plurality of cells comprise the first contiguous cavity and the second contiguous cavity separated from the first contiguous cavity by the partition.

15. The container of claim 9, wherein the wall comprises a plurality of generally planar surfaces.

16. The container of claim 15, wherein one or more of the generally planar surfaces comprises an undulation.

17. The container of claim 9, wherein the external wall and the partition comprise a solidified material comprising one or more of a metal, a metal matrix composite, a glass, an elastomer, a confection, a thermoplastic polymer, and a thermosetting polymer.

18. The container of claim 9, wherein each of the plurality of cells comprises a permeable storage material configured to store a fluid.

19. A vehicular assembly, comprising a vehicle with a fuel system, the fuel system comprising the container of claim 9.

20. A method for storing a fluid under pressure, comprising introducing a fluid under pressure through an inlet into the container of claim 9; and
closing the inlet.

21. The structural component of claim 1, wherein the support structure is integrally cast with the external wall.

* * * * *